(12) United States Patent
Yan

(10) Patent No.: US 6,241,406 B1
(45) Date of Patent: Jun. 5, 2001

(54) COMPUTER KEYBOARD

(76) Inventor: Leung Lap Yan, Flat A, 7 F, Lisa House, 33 Nelson Street, Mongkok, Kowloon (HK)

( * ) Notice: Subject to any disclaimer, the term of this patent is extended or adjusted under 35 U.S.C. 154(b) by 0 days.

(21) Appl. No.: 09/399,325

(22) Filed: Sep. 20, 1999

(30) Foreign Application Priority Data

Sep. 22, 1998 (HK) ................................................ 98240223

(51) Int. Cl.[7] .................................................... B41J 5/10
(52) U.S. Cl. ........................................... 400/489; 400/486
(58) Field of Search .................................... 400/489, 486, 400/472, 477, 485, 479; 341/22, 23; D14/114, 115; 235/145 R; 345/168, 169; 361/680

(56) References Cited

U.S. PATENT DOCUMENTS

| D. 336,084 | * | 6/1993 | Choi .................................... D14/115 |
| D. 350,537 | * | 9/1994 | Smith .................................. D14/115 |
| D. 365,552 | * | 12/1995 | Marquardt et al. ................. D14/115 |
| D. 416,008 | * | 11/1999 | Robinson et al. ................... D14/100 |
| 5,318,367 | * | 6/1994 | Braun et al. ......................... 400/489 |
| 5,775,822 | * | 7/1998 | Cheng ................................. 400/486 |
| 5,880,685 | * | 3/1999 | Weeks ................................. 341/22 |
| 6,010,260 | * | 1/2000 | Chao ................................... 400/489 |

FOREIGN PATENT DOCUMENTS

| 815100588U | 9/1985 | (CN) . |
| 85105750A | 1/1986 | (CN) . |
| 94225041 | 10/1994 | (CN) . |
| 94221643 | 6/1995 | (CN) . |
| 94247888 | 12/1995 | (CN) . |
| 97211583 | 9/1998 | (CN) . |

* cited by examiner

*Primary Examiner*—John S. Hilten
*Assistant Examiner*—Anthony H. Nguyen
(74) *Attorney, Agent, or Firm*—Finnegan, Henderson, Farabow, Garrett & Dunner, L.L.P.

(57) ABSTRACT

A computer keyboard connected with a computer for instruction and information input, the keyboard comprises the numeric keys, letter keys, function keys and symbolic keys. Only one set of numeric keys is arranged, and the set of numeric keys are arranged in the middle part of the keyboard, the letter keys are separated into two sets by the numeric keys, the two sets of letter keys lie on the left and right sides of the numeric keys respectively. The letter keys have the same order as those on a conventional keyboard, both sets of the letter keys are arranged slantwise; the function keys and symbolic keys are arranged in a left-right balanced manner. The keyboard of the invention makes a break through at the arrangement of the keys, it is easy to remember by human brain and convenient to operate, and can speed up the input speed and reduce typing error.

9 Claims, 2 Drawing Sheets

COMPUTER KEYBOARD

BACKGROUND OF THE INVENTION

1. Field of the Invention

The invention relates to a computer keyboard, and in particular to a computer keyboard which is convenient to operate at high speeds.

2. Description of the Related Art

The current computer keyboard is derived from the keyboard of an English typewriter, the keys of which are distributed such that the letter keys are located in the middle, while the numeric keys, function keys and symbolic keys are arranged around the letter keys. Due to the close correlation between the computer keyboard and the typewriter keyboard, people often overlook the drawbacks of the various current computer keyboards, i.e. the so called standard keyboards in respect to the distribution of the keys. For instance, the letter keys are too concentrated, there are two sets of numeric keys and the locations of the two sets are not in equilibrium, and the function keys and symbolic keys are also irregularly arranged. Therefore, it is not easy for an operator to remember the locations of the keys, and typing errors tend to occur upon inputting information and instructions. Consequently, it is necessary to rearrange the locations of the keys of a conventional keyboard.

SUMMARY OF THE INVENTION

An object of the invention is to provide a keyboard, the keys of which are distributed to conform with the equilibrium characteristics of the human brain, the arrangement of the various keys makes it easy for the operator to remember the locations of the keys, and input operations can be carried out faster and more accurately.

To achieve the object of the invention, there is provided a computer keyboard having a left side, a right side, and a middle portion. The keyboard is operably connected to a computer for inputting information and instructions, and comprises at least one numerical key arranged in the middle portion of the key board for inputting numerical information, and a plurality of letter keys separated by the at least one numerical key into first and second sets respectively arranged on the left and right sides of the keyboard. According to the invention, the letter keys are arranged in the same order as those on a conventional keyboard, but various changes have been made to the locations of the letter keys and the locations of other function keys. For example, the location of the symbolic keys has been changed so as to conform with the left-right equilibrium characteristics of human brain, facilitate operation of the keyboard itself, and save space.

Several exemplary advantages of the keyboard of the invention lie in that: its function is the same as that of a conventional keyboard; since the keys are left-right symmetrically arranged and the numeric keys are located at the middle part, the keyboard of the invention enables the operator to operate in a balanced fashion; and it is very convenient to input English alphabets, Chinese characters, numerals and symbols. The keyboard of the invention is an improvement on the conventional keyboard in respect of the arrangement of the keys, it can speed up input, decrease the typing errors, and reduce the size of the keyboard.

BRIEF DESCRIPTION OF THE DRAWINGS

The invention will be described in detail in conjunction of the accompanying drawings in which.

DETAILED DESCRIPTION OF THE PREFERRED EMBODIMENTS

Figure 1:
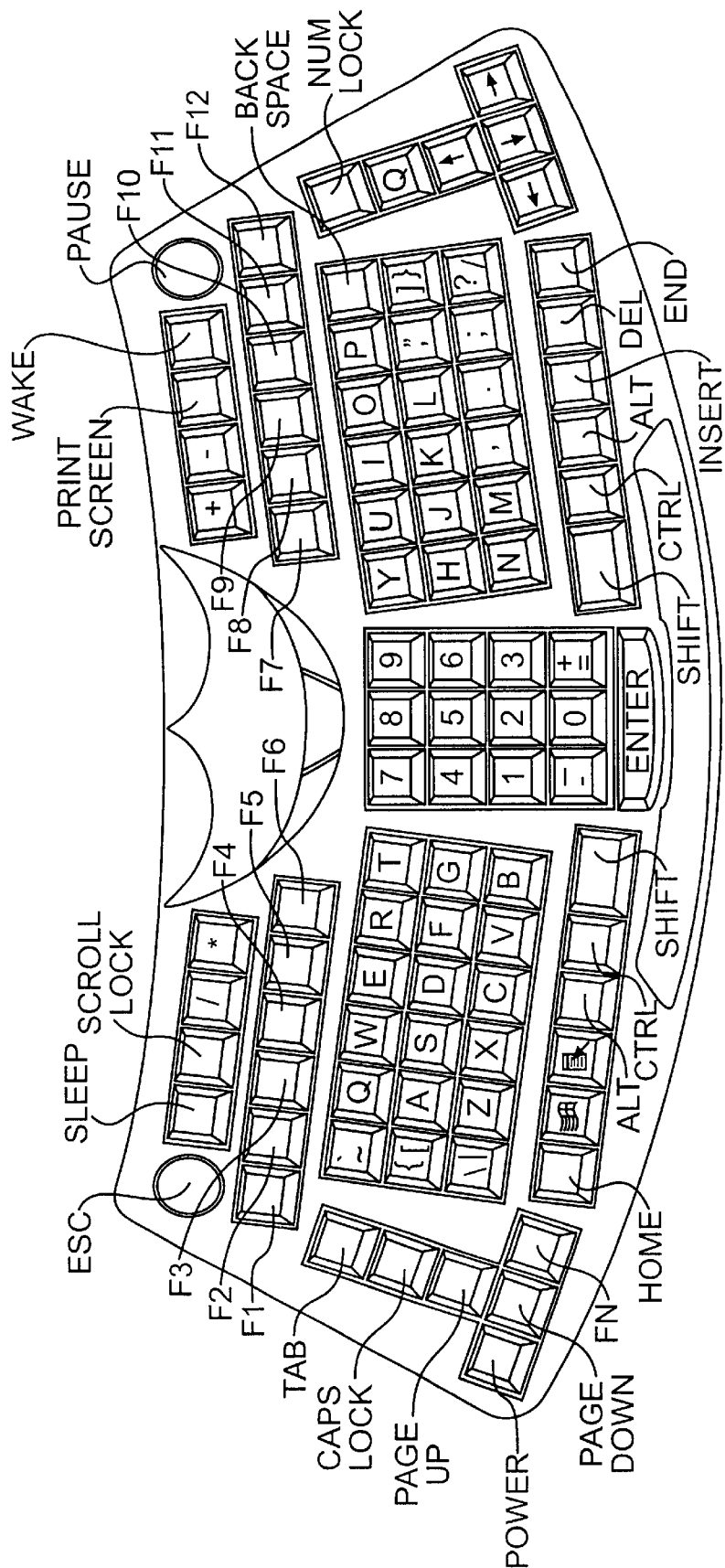
FIG. 1 is a view showing the arrangement of the various keys of the keyboard in accordance with the invention.

FIG. 1 shows the arrangement of various keys on a keyboard according to the invention. The keyboard comprises the numeric keys, letter keys, function keys and symbolic keys. With regard to the arrangement of the keys on the keyboard, one remarkable feature of the invention is that the ten numeric keys 0–9 are arranged in the middle of the keyboard. The arrangement of the ten numeric keys takes the shape of a rectangle 3 keys by 4 keys. Arranged along the top row are the numeric keys "7", "8", and "9"; arranged along the second row are the numeric keys "4", "5", "6"; arranged along the third row are the numeric keys "1", "2", "3"; and the numeric key "0" is arranged in the middle of the fourth row with a function key on either side thereof. The ten numeric keys are arranged in the same way as those on the conventional keyboards and those on the telephone, therefore it is easy to remember them and convenient in use. Furthermore, only one set of numeric keys are arranged, another set of numeric keys on the conventional keyboard are omitted and therefore more space is saved.

The letter keys constitute the most important part of the keyboard, the keyboard of the invention also uses the 26 letter keys which consists of "a", "b", through "x", "y", and "z". On the conventional keyboard, there are ten letter keys in the first row and the second row respectively, and the ten letter keys are arranged successively, therefore it is inconvenient to remember them and the user tends to make typing errors. According to the invention, the letter keys, which are in the same order as those on a conventional keyboard, are divided into two parts. According to the invention, the 26 letter keys are separated into the right part and the left part by the numeric keys which lie between the letter keys "T", "Y" in the first row, "G", "H" in the second row, and "B", "N" in the third row. Just like a ten-digit telephone number that is easy to remember when being divided into a few parts, it is much easier to remember the locations of the 5 letter keys arranged successively. Moreover, with the letter keys being separated into two parts, there remains a wider interval between the two hands of the operator, and the user will not be fatigued with long-time work.

As the most frequently used function key, the "ENTER" key is conventionally arranged on the right side. In the keyboard of the present invention, because this key is the most frequently used function key, it is arranged at the most convenient location, i.e. it is arranged in the middle of the keyboard and below the numeric keys. In order to coordinate with the arrangement of ten numeric keys above, the width of the "ENTER" key is three times as much as that of a numeric key.

The function keys and the symbolic keys on the keyboard in accordance with the invention are arranged on the left and right sides in a balanced fashion, for example, the function keys "F1" to "F12", which are arranged in sequence, are divided into two symmetrical sets, with the keys "F1" to "F6" on the left and the keys "F7" to "F12" on the right. The peripheral function keys and symbolic function keys are also arranged symmetrically as far as possible. For example, the bracket keys and quotation mark keys of the symbolic keys are arranged respectively on the left and right sides of the keyboard in a customary using sequence. Such an arrangement is logical and conforms with the left-right equilibrium characteristics of the human brain. The left bracket key is arranged on the left side of the keyboard while the right bracket key on the right side of the keyboard. With this regularity, the user does not need to look for the position of the corresponding key when typing.

The keyboard of the invention, which takes the shape of a sector, is different from the conventional rectangular keyboard. The side of the sectorial keyboard which is adjacent to the user takes the shape of a circular arc, so that the keyboard has a smooth profile. The side of the keyboard which is adjacent to the user is wide, while the side of the keyboard which is remote from the user is narrow, such a configuration facilitates the operation of the keyboard by the user. There are six editorial function keys, such as a plurality of directional arrow keys, a "NUM LOCK" key, a "TAB" key, a "CAPS LOCK" key, a "PAGE UP" key, and a "PAGE DOWN key, on the leftmost side and on the rightmost side respectively, i.e., between the letter keys and the outer periphery of keyboard, which are arranged in a "T" configuration, four keys of the six keys are in the middle, and there is a key on either side of the lowest key, such a configuration facilitates operation of the keyboard.

Figure 2:
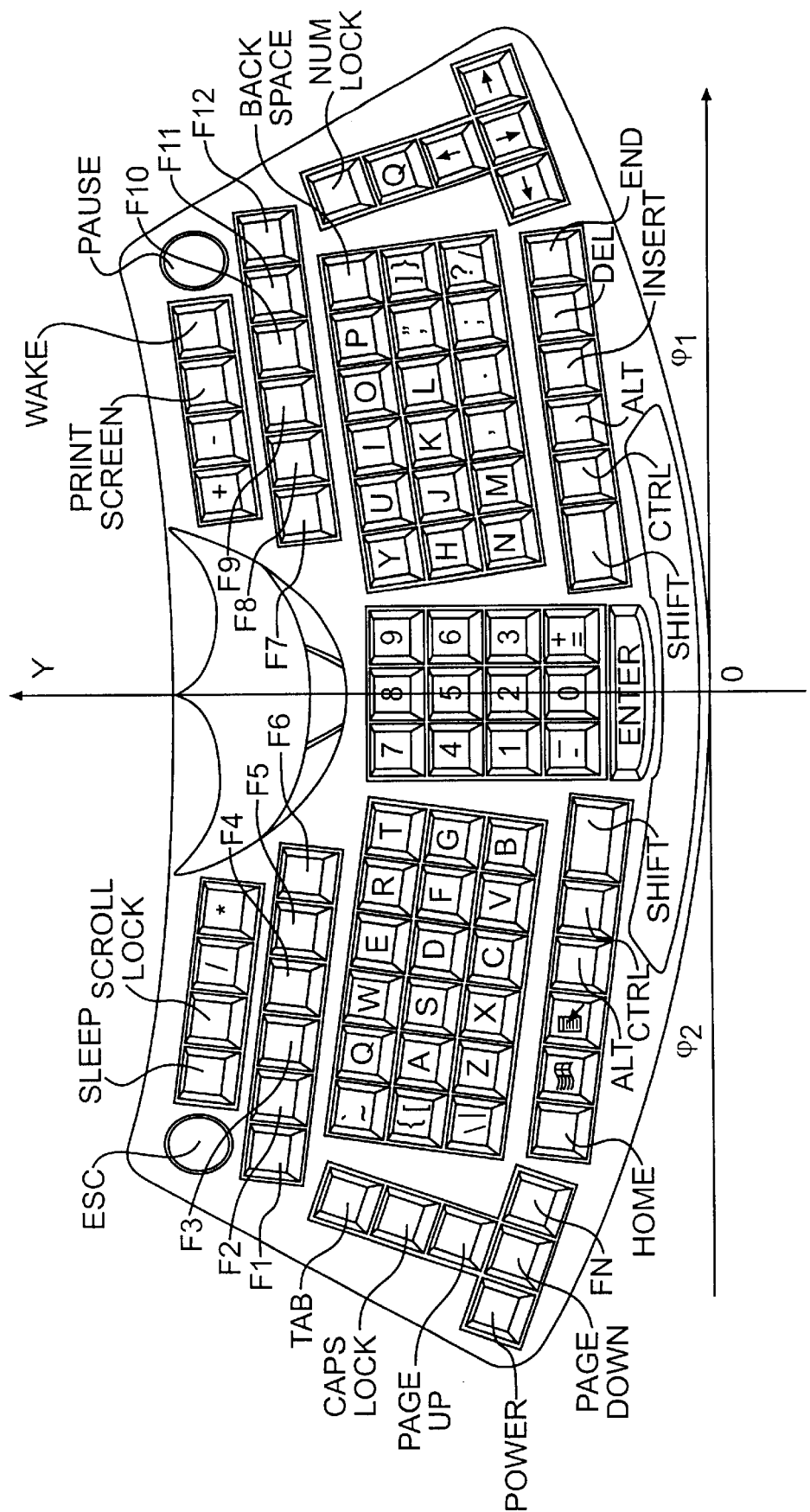
FIG. 2 is a view of the keyboard in accordance with the invention, which lies in a system of rectangular coordinates.

Referring to FIG. 2, there is shown a keyboard having the same shape and key distribution as that shown in FIG. 1, since the keyboard has inclined features as to its shape and the arrangement of keys, a coordinate system is used to facilitate description. The line which passes through the middle point of the circular arc and runs parallel to the numeric keys is used as a coordinate or lateral X axis, while the central symmetric axis of the sector is used as coordinate Y axis. As clearly shown in the figure, in this embodiment, except the numeric keys and the "ENTER" key, all the other keys are arranged in a inclined fashion accordingly. In particular, the two sets of letter keys are arranged in a inclined fashion. The lines along which the letter keys are arranged make angles of $\phi_1$, $\phi_2$ with coordinate axis x respectively, here the inclination angles ($\phi_1$ and $\phi_2$) are equal, and they are within the range of 10°–25°, e.g., $\phi_1=\phi_2 20°$, said lines incline upwards symmetrically relative to coordinate Y axis. The advantage of such an arrangement lies in that, after an operator gets familiar with the keyboard, he or she can distinguish the key being touched from others by its inclination and location, and this further facilitates memorization and operation of the keys. Of course, angle $\phi$ may adopt different values, and all of them are within the scope of the invention. Even if $\phi$ has a value of 0°, it does not depart from the spirit and scope of the invention.

What is claimed is:

1. A computer keyboard having a left side, a right side, and a middle portion and operably connected to a computer for inputting information and instructions, comprising:

a plurality of numerical keys arranged in the middle portion of the keyboard for inputting numerical information;

a plurality of letter keys separated by the at least one numerical key into first and second sets respectively arranged on the left and right sides of the keyboard; and wherein the plurality of numerical keys are configured to form a rectangle having numerical keys "7", "8", and "9" arranged in a top first row, numerical keys "4", "5", and "6" arranged in a second row, numerical keys "1", "2", and "3" arranged in a third row, and the numeric key "0" arranged in the middle of the fourth row with a function key on either side thereof.

2. A computer keyboard having a left side, a right side, and a middle portion and operably connected to a computer for inputting information and instructions, comprising:

at least one numerical key arranged in the middle portion of the keyboard for inputting numerical information;

a plurality of letter keys separated by the at least one numerical key into first and second sets respectively arranged on the left and right sides of the keyboard; and an "Enter" key located below the at least one numerical key and having a width that is three times a width of the at least one numerical key.

3. A computer keyboard having a left side, a right side, and a middle portion and operably connected to a computer for inputting information and instructions, comprising:

at least one numerical key arranged in the middle portion of the keyboard for inputting numerical information;

a plurality of letter keys separated by the at least one numerical key into first and second sets respectively arranged on the left and right sides of the keyboard;

at least one set of editorial keys arranged in an inverse T-shaped configuration between one of the first and second sets of letter keys and an outer periphery of the keyboard;

matching function keys and matching symbolic keys arranged to achieve a left-right equilibrium; and wherein the matching function keys comprise a left bracket key arranged on the left side of the keyboard and a right bracket key arranged on the right side of the keyboard.

4. A computer keyboard having a left side, a right side, and a middle portion and operably connected to a computer for inputting information and instructions, comprising:

at least one numerical key arranged in the middle portion of the keyboard for inputting numerical information;

a plurality of letter keys separated by the at least one numerical key into first and second sets respectively arranged on the left and right sides of the keyboard;

at least one set of editorial keys arranged in an inverse T-shaped configuration between one of the first and second sets of letter keys and an outer periphery of the keyboard;

matching function keys and matching symbolic keys arranged to achieve a left-right equilibrium; and wherein the matching symbolic keys comprise a left quotation mark key arranged on the left side of the keyboard and a right quotation mark key arranged on the right side of the keyboard.

5. A computer keyboard having a left side, a right side, a middle portion, and an outer periphery, and operably connected to a computer for inputting information and instructions, comprising:

at least one numerical key arranged in the middle portion of the keyboard for inputting numerical information;

a plurality of letter keys separated by the at least one numerical key into a first set of letter keys arranged on the left side of the keyboard and a second set of letter keys arranged on the right side of the keyboard;

a first set of editorial function keys arranged between the first set of letter keys and the outer periphery of the computer keyboard;

a second set of editorial function keys arranged between the second set of letter keys and the outer periphery of the computer keyboard; and wherein the first and second sets of editorial keys are each arranged in an inverse T-shaped configuration and the first set of editorial function keys include a page up key and a page down key.

6. The computer keyboard of claim 5, wherein the second set of editorial function keys include four directional arrow keys and a number lock key.

7. The computer keyboard of claim 5, wherein the keyboard defines a lateral X axis and a coordinate Y axis perpendicular to the lateral X axis, the first and second sets of letter keys are equally inclined relative to the lateral X axis within a range of 10–25 degrees and incline upwards symmetrically relative to the coordinate Y axis, and the at least one numerical key has a top surface parallel to the lateral X axis and a side surface parallel to the coordinate Y axis.

8. A computer keyboard having a left side, a right side, a middle portion, and an outer periphery, and operably connected to a computer for inputting information and instructions, comprising:
- at least one numerical key arranged in the middle portion of the keyboard for inputting numerical information;
- a plurality of letter keys separated by the at least one numerical key into a first set arranged on the left side of the keyboard and a second set arranged on the right side of the keyboard;
- at least one pair of matching function keys including a left symbolic function key arranged between the first set of letter keys and an outer periphery of the keyboard and a right symbolic function key arranged between the second set of letter keys and the outer periphery of the keyboard; and
- wherein the left symbolic function key comprises a left bracket key and the right symbolic function key comprises a right bracket key.

9. A computer keyboard having a left side, a right side, a middle portion, and an outer periphery, and operably connected to a computer for inputting information and instructions, comprising:
- at least one numerical key arranged in the middle portion of the keyboard for inputting numerical information;
- a plurality of letter keys separated by the at least one numerical key into a first set arranged on the left side of the keyboard and a second set arranged on the right side of the keyboard;
- at least one pair of matching function keys including a left symbolic function key arranged between the first set of letter keys and an outer periphery of the keyboard and a right symbolic function key arranged between the second set of letter keys and the outer periphery of the keyboard; and
- wherein the left symbolic function key comprises a left quotation mark key and the right symbolic function key comprises a right quotation mark key.

\* \* \* \* \*